United States Patent
Hooke et al.

(10) Patent No.: US 9,846,017 B1
(45) Date of Patent: Dec. 19, 2017

(54) HIGH PRESSURE OBTURATORS AND METHOD OF MAKING

(71) Applicant: The United States of America as Represented by the Secretary of the Army, Washington, DC (US)

(72) Inventors: Ryan Hooke, Bangor, PA (US); Tyler Myers, Lebanon, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 658 days.

(21) Appl. No.: 14/255,301

(22) Filed: Apr. 17, 2014

(51) Int. Cl.
| | |
|---|---|
| *F42B 14/02* | (2006.01) |
| *B29B 11/08* | (2006.01) |
| *B29C 70/68* | (2006.01) |
| *B29B 11/04* | (2006.01) |
| B29L 31/26 | (2006.01) |
| B29L 31/00 | (2006.01) |

(52) U.S. Cl.
CPC ............. *F42B 14/02* (2013.01); *B29B 11/04* (2013.01); *B29B 11/08* (2013.01); *B29C 70/682* (2013.01); *B29C 70/683* (2013.01); B29L 2031/26 (2013.01); B29L 2031/777 (2013.01)

(58) Field of Classification Search
CPC ..... F16J 15/3272; F42B 14/067; F42B 14/06; F42B 14/064; F42B 14/02
USPC .................................................. 277/546–548
See application file for complete search history.

(56) References Cited

U.S. PATENT DOCUMENTS

| 2,672,814 | A | * | 3/1954 | Dubost | E21B 43/116 |
| | | | | | 102/523 |
| 2,996,012 | A | * | 8/1961 | Butler | F42B 14/02 |
| | | | | | 102/527 |
| 3,769,912 | A | * | 11/1973 | Friend | F42B 14/064 |
| | | | | | 102/522 |
| 3,786,760 | A | * | 1/1974 | Feldmann | F42B 14/02 |
| | | | | | 102/527 |
| 3,939,773 | A | * | 2/1976 | Jenkins | F42B 10/04 |
| | | | | | 102/526 |
| 4,195,573 | A | * | 4/1980 | Leeker | F42B 10/06 |
| | | | | | 102/520 |
| 4,242,961 | A | * | 1/1981 | Moredock | F42B 14/02 |
| | | | | | 102/527 |
| 4,385,561 | A | * | 5/1983 | Madderra | F42B 14/06 |
| | | | | | 102/523 |
| 4,476,785 | A | * | 10/1984 | Hoffman | F42B 14/067 |
| | | | | | 102/522 |
| 4,552,071 | A | * | 11/1985 | Horais | F42B 14/02 |
| | | | | | 102/524 |
| H405 | H | * | 1/1988 | Covey | F42B 14/06 |
| | | | | | 102/520 |

(Continued)

*Primary Examiner* — Eugene G Byrd
(74) *Attorney, Agent, or Firm* — Michael C. Sachs (57) ABSTRACT

A high pressure obturator for a breech loaded, tube-launched projectile includes a generally annular ring having a central longitudinal axis and a radially inward portion. A flange portion is disposed radially outward of and partially contiguous with the radially inward portion. The flange portion extends axially forward and aft beyond the radially inward portion. The outer diameter of the flange portion decreases linearly from an aft most outer diameter to a forward most outer diameter. The obturator may be formed of a plastic material and include circumferential wraps of a high-strength fiber completely embedded in grooves in the obturator.

2 Claims, 10 Drawing Sheets

(56) References Cited

U.S. PATENT DOCUMENTS

| | | | | |
|---|---|---|---|---|
| 5,164,540 A | * | 11/1992 | Chiarelli | B29C 70/74 |
| | | | | 102/521 |
| 6,085,660 A | * | 7/2000 | Campoli | F42B 14/061 |
| | | | | 102/439 |
| 6,085,662 A | * | 7/2000 | Nilsson | F42B 14/02 |
| | | | | 102/526 |
| 6,412,419 B1 | * | 7/2002 | Brinkmann | F42B 14/02 |
| | | | | 102/524 |

* cited by examiner

HIGH PRESSURE OBTURATORS AND METHOD OF MAKING

STATEMENT OF GOVERNMENT INTEREST

The inventions described herein may be manufactured, used and licensed by or for the United States Government.

BACKGROUND OF THE INVENTION

The invention relates in general to tube-launched projectiles and in particular to obturators for such projectiles.

Obturators are used on tube-launched projectiles to create a gas seal. The propellant gas behind the obturator propels the projectile out of the launching tube. Some projectiles and their obturators are designed to be launched from rifled tubes while other projectiles and their obturators are designed to be launched from smooth bore tubes. In some cases, projectiles launched from rifled tubes must have minimal or no spin. In these cases, a slip obturator is necessary. Slip obturators decouple the rifling effects of a rifled launch tube from the projectile. Slip obturators enable fin-stabilized munitions to be launched from rifled barrels with a minimum of barrel-induced spin or from smooth barrels with no barrel-induced spin.

The testing of a projectile may include launching the projectile from a tube. The propellant gas pressure in the tube may be very high. Gas pressures can be as high as 125% of the permissible maximum operating pressure for the projectile, for example, as high as 75,000 psi for artillery. Specially designed cannon and breech combinations are used to conduct high pressure testing of projectiles. The obturator used on a projectile during high pressure testing or other high pressure use must provide a high pressure gas seal. If the launch tube is equipped with a muzzle brake, it is preferable that the obturator remains intact and on the projectile through the muzzle brake and after muzzle exit as the projectile clears the weapon, or else the discarded obturator or parts of it may damage or destroy the muzzle brake and/or other equipment and personnel.

Examples of obturators are disclosed in U.S. Pat. No. 3,760,736 issued on Sep. 25, 1973; U.S. Pat. No. 6,085,660 issued on Jul. 11, 2000; U.S. Pat. No. 4,109,582 issued on Aug. 29, 1978; U.S. Pat. No. 4,242,961 issued on Jan. 6, 1981; and U.S. Pat. No. 5,164,540 issued on Nov. 17, 1992.

A need exists for obturators for projectiles subject to very high pressures, and for high pressure obturators that remain intact and on the projectile after muzzle exit.

SUMMARY OF INVENTION

One aspect of the invention is an obturator for a tube-launched projectile. The projectile has a central longitudinal axis and a circumferential obturator slot. The obturator includes a generally annular ring having a central longitudinal axis. The annular ring has a radially inward portion and a flange portion disposed radially outward of the radially inward portion. The radially inward portion has an inside diameter and an axial length. The flange portion is disposed radially outward of and partially contiguous with the radially inward portion. The flange portion extends axially forward and aft beyond the radially inward portion. The outer diameter of the flange portion decreases linearly from its aft most outer diameter to its forward most outer diameter to form a tapered surface.

The radially inward portion may have an axial cross-section in a shape of a rectangle or a frustum of a right circular cone. The angle between the tapered surface and the central longitudinal axis of the annular ring may be about three degrees.

The radial clearance between the flange portion and the projectile may be greater than the radial clearance between the radially inward portion and the projectile. The flange portion may extend axially forward and aft beyond the obturator slot.

Another aspect of the invention is a method of making a composite obturator. The method includes injection molding a preform using a plastic material. The preform has a central longitudinal axis. Then, the preform is machined into a generally annular ring and at least one circumferential groove is machined in the annular ring. High-strength fiber is wrapped in the circumferential groove or grooves. The machined preform wrapped with the high-strength fiber is then overmolded using a plastic material. The overmolded preform is final machined to produce a finished obturator.

The step of machining a plurality of circumferential grooves may include machining a plurality of circumferential grooves that are parallel and slant in an aft direction.

The invention will be better understood, and further objects, features and advantages of the invention will become more apparent from the following description, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION

The obturators disclosed herein may be used on spinning or non-spinning projectiles; on fin-stabilized or spin-stabilized projectiles; on breech-loaded projectiles with or without a cartridge case; and on projectiles ranging in caliber from 0.125 inches to eighteen inches. The obturators are made of non-metallic materials. The obturators may be made of a single solid material or made of a composite material. The obturators may remain intact on the projectile after muzzle exit or the obturators may be discarded if desired. Obturators that remain intact on the projectile after muzzle exit are preferred for launch tubes equipped with muzzle brakes and in cases where the obturator enhances the aerodynamic performance of the projectile.

The obturators disclosed herein provide a high pressure gas seal, for example, up to 75,000 psi. Thus, the obturator designs may be suitable as O-rings or seals for commercial or industrial use, such as high pressure joints, vessels, shafts, and valves where similar dynamic loading occurs.

Figure 1:
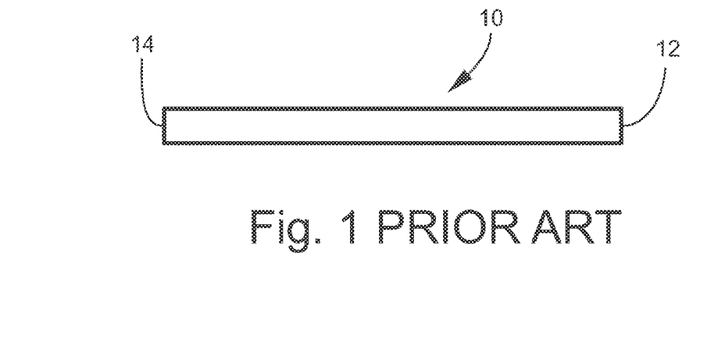
FIG. 1 is a schematic side view of a projectile launch tube.
Figure 2:
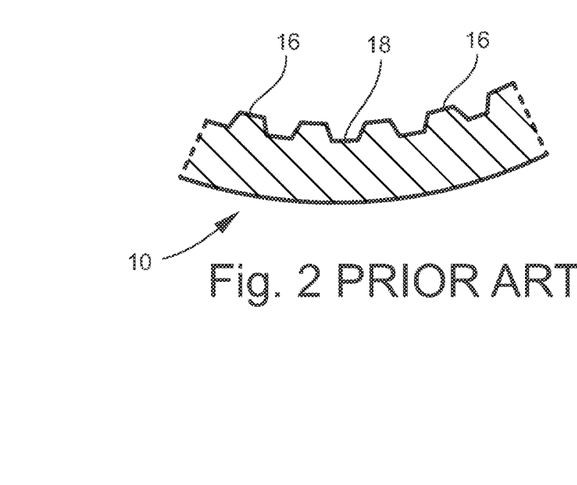
FIG. 2 is an enlarged transverse sectional view of a portion of the tube of FIG. 1.

FIG. 1 is a schematic side view of a projectile launch tube 10 having a muzzle 12 and a breech 14. FIG. 2 is a schematic transverse sectional view of tube 10 showing rifling lands 16 and rifling grooves 18 formed in the interior of tube 10. However, tube 10 may also be a smooth-bore tube with no lands and grooves.

Figure 3:
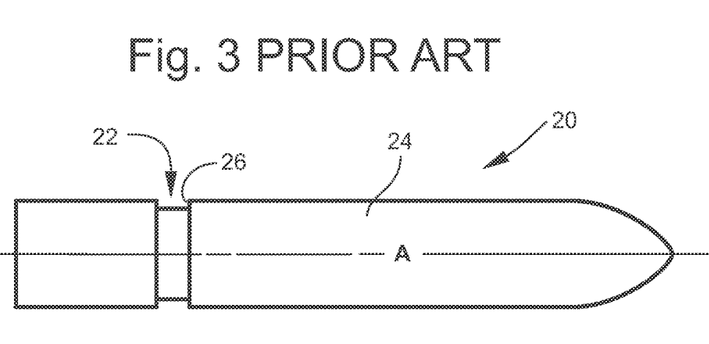
FIG. 3 is a schematic side view of one embodiment of a projectile.
Figure 4:
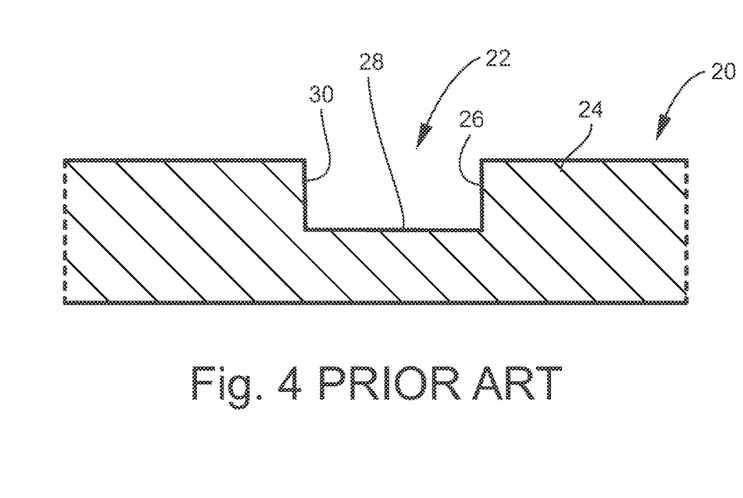
FIG. 4 is an enlarged transverse sectional view of a portion of the projectile of FIG. 3.

FIG. 3 is a schematic side view of one embodiment of a projectile 20 that may be launched from tube 10. Projectile 20 has a central longitudinal axis A and an obturator slot 22 formed on the exterior of its body 24. FIG. 4 is an enlarged view of slot 22. Slot 22 may include a forward planar surface 26. Planar surface 26 may be normal to axis A of projectile 20. Slot 22 may include a bottom planar surface 28 that is normal to forward planar surface 26. Slot 22 may include an aft planar surface 30 that is parallel to forward planar surface 26 and/or normal to bottom planar surface 28.

Figure 5:
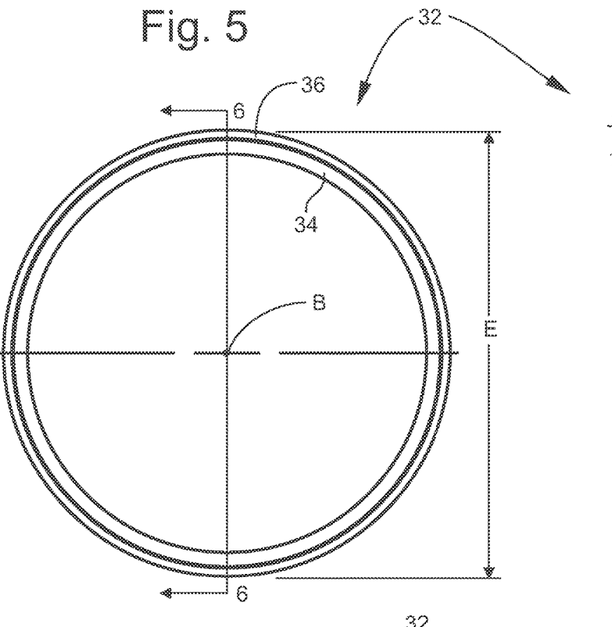
FIG. 5 is an aft view of one embodiment of an obturator
Figure 6:
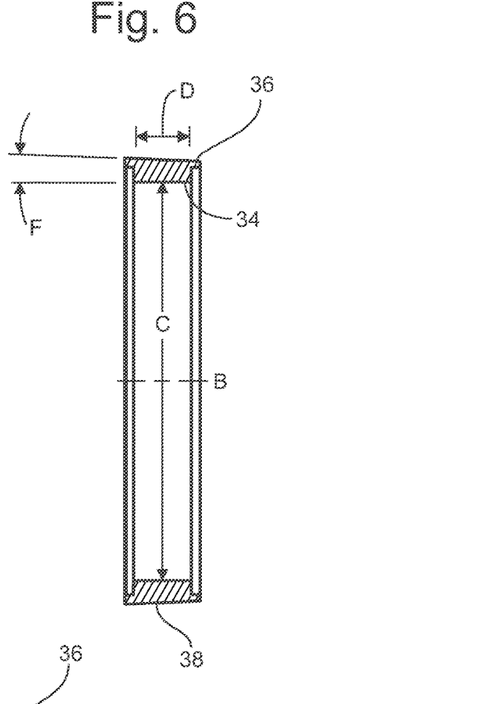
FIG. 6 is an axial sectional view along the line 6-6 of FIG. 5.
Figure 7:
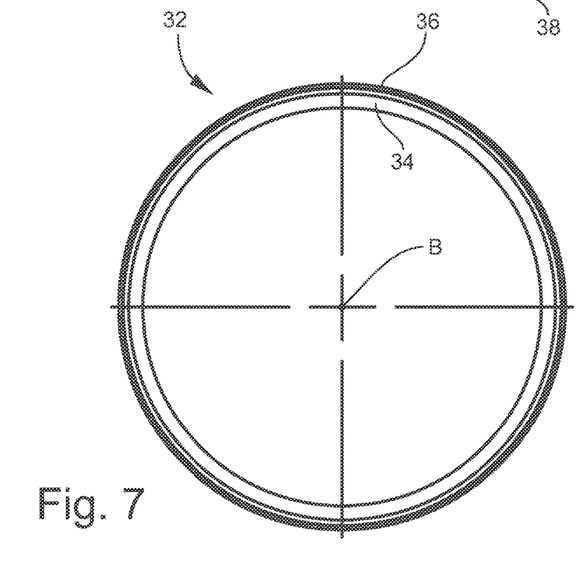
FIG. 7 is a front view of the obturator of FIG. 5.
Figure 8:
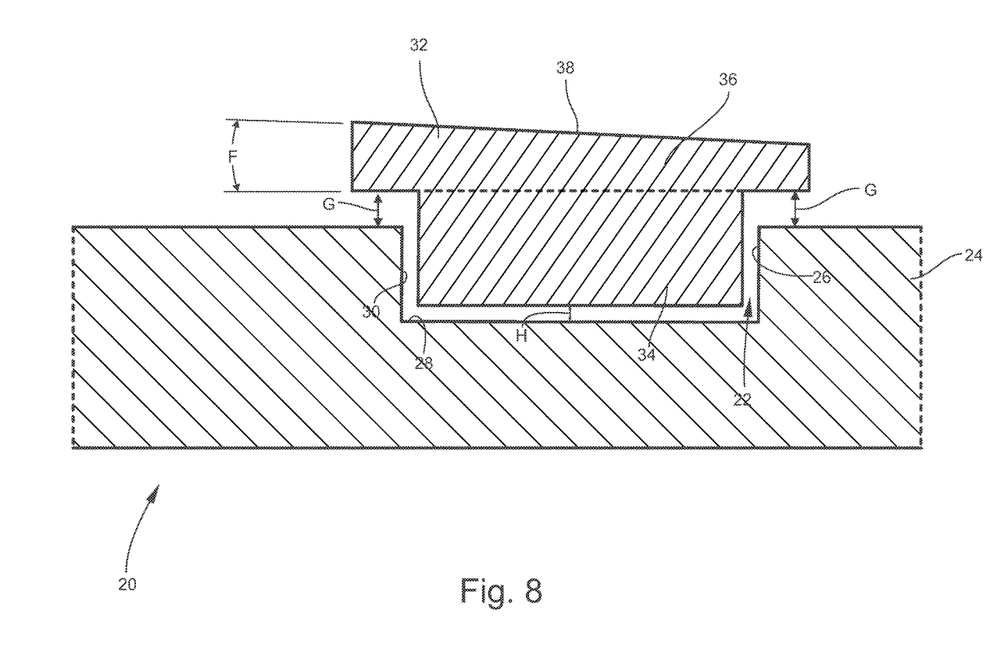
FIG. 8 is an axial sectional view of the obturator of FIG. 5 disposed in an obturator slot in a projectile.

FIG. 5 is an aft view of one embodiment of an obturator 32 that may be disposed in obturator slot 22 of projectile 20. FIG. 6 is a sectional view along the line 6-6 of FIG. 5. FIG. 7 is a Front view of obturator 32. FIG. 8 is an enlarged sectional view showing obturator 32 in obturator slot 22 of projectile 20. In FIG. 8, the arrow points toward the forward end of projectile 20 and muzzle end 12 of launch tube 10, when projectile 20 is loaded in tube 10.

Obturator 32 is a generally annular ring having a central longitudinal axis B. Obturator 32 includes a radially inward portion 34 having an inside diameter C and an axial length D. As best seen in FIG. 8, the axial cross-section of radially inward portion 34 has the shape of a rectangle. In FIG. 8, the upper side of the rectangle is shown in broken line. A flange portion 36 is disposed radially outward of and partially contiguous with radially inward portion 34. Flange portion 36 extends axially forward and aft beyond radially inward portion 34 and axially forward and aft beyond obturator slot 22. An outer diameter E (FIG. 5) of flange portion 36 decreases linearly from an aft most outer diameter to a forward most outer diameter to form a tapered surface 38.

The angle F (FIG. 8) between tapered surface 38 and central longitudinal axis B may be, for example, about three degrees. The radial clearance G (FIG. 8) between flange portion 36 and projectile 20 is greater than the radial clearance H between radially inward portion 34 and bottom surface 28 of obturator slot 22. In one embodiment, radial clearance G is about twice as large as radial clearance H. If launch tube 10 is rifled, and to enable decoupling of the rifling-induced spin from projectile 20, radial clearance H may be about 0.001%-0.002% of the bore diameter of tube 10. To couple the rifling-induced spin to projectile 20, radial clearance H may be no clearance or an interference fit of about 0.001%-0.2% of the bore diameter of tube 10 to thereby produce mechanical adhesion. The desired adhesion may also be achieved with sealants, glues, adhesives, over molding or similar mechanical or chemical methods.

Compared to known obturators that fit in slot 22, obturator 32 provides a longer axial barrier (axial length of flange portion 36) to prevent blow-by of propellant gas. In addition, in terms of decoupling efficiency, because radial clearance G is larger than radial clearance H, obturator 32 with flange portion 36 creates less friction with projectile 20 than known obturators that have the same volumetric interference as obturator 32 (i.e., "flange-less" obturators having the same axial width as the axial width of flange portion 36).

Obturator 32 may be made of a plastic material, for example, polyester, polypropylene, polyetheretherketone, various types of nylon, polyphthalamide, etc. As will be described below, obturator 32 may also be made of a composite material, for example, a plastic with embedded circumferential wraps of high-strength continuous or semi-continuous fibers.

Figure 9:
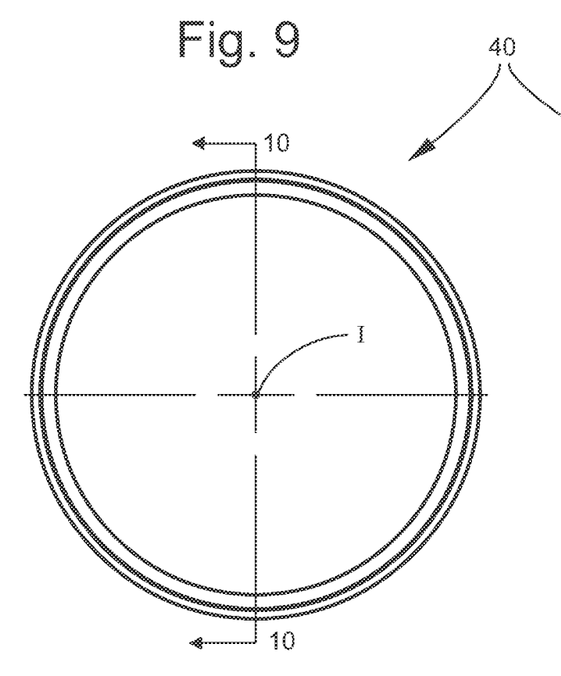
FIG. 9 is an aft view of another embodiment of an obturator.
Figure 10:
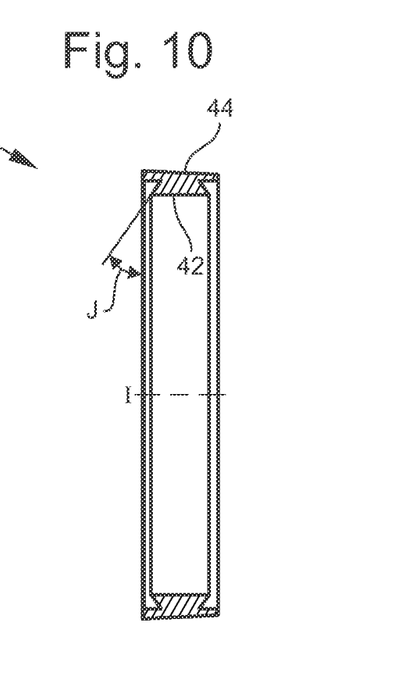
FIG. 10 is an axial sectional view along the line 10-10 of FIG. 9.
Figure 11:
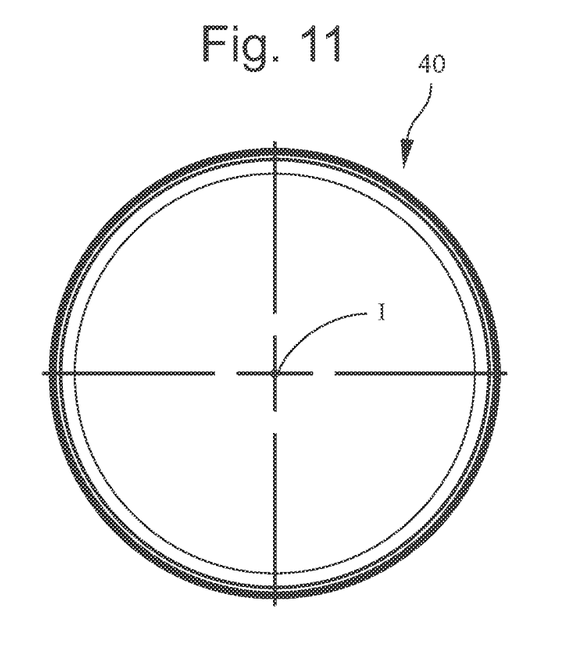
FIG. 11 is a front view of the obturator of FIG. 9.

FIG. 9 is an aft view of another embodiment of an obturator 40 having a central longitudinal axis I. FIG. 10 is an axial sectional view along the line 10-10 of FIG. 9. FIG. 11 is a front view of obturator 40. Obturator 40 differs from obturator 32 by using a differently shaped radially inward portion 42. In obturator 40, radially inward portion 42 has an axial cross-section in a shape of a frustum of a right circular cone. The values of the radial clearances, taper of surface 44, and materials of construction may be similar to obturator 32. The slant angle J (FIG. 10) of the frustum of radially inward portion 42 may be, for example, in a range of about five degrees to about fifty degrees. The frusto-conical shape of radially inward portion 42 may help prevent obturator 40 from separating from projectile 20 after muzzle exit.

A composite construction for high pressure obturators includes one or more circumferential wraps of high-strength fibers embedded in a plastic material. The composite construction may prevent the obturator from separating from the projectile or disintegrating, after muzzle exit. The matrix used in the composite obturator may be, for example, one or more of polyester, polypropylene, polyetheretherketone, various types of nylon, polyphthalamide, etc. The high-strength fibers used in the composite obturator may be, for example, one or more of aramid fibers, electrospun fibers, electrospun nanofibers, Vectran®, Kevlar®, Nomex®, Technora®, Twaron®, Dyneema®, Spectra®, Zylon®, PTFE, carbon, graphite, fiberglass, carbon nanotube fiber, etc.

The combined strength of the plastic and the high-strength fiber in the composite obturator must be sufficient to prevent the obturator from centrifugally destroying itself and enable the obturator to dynamically survive hoop stresses imposed by the differential pressures acting on the obturator at muzzle exit. The differential pressures may be up to 500,000 psi. A minimum combined specific strength of the obturator is about 785 kN m/kg. The high-strength fiber itself should have a minimum specific strength of about 2071 kN m/kg.

Figure 12:
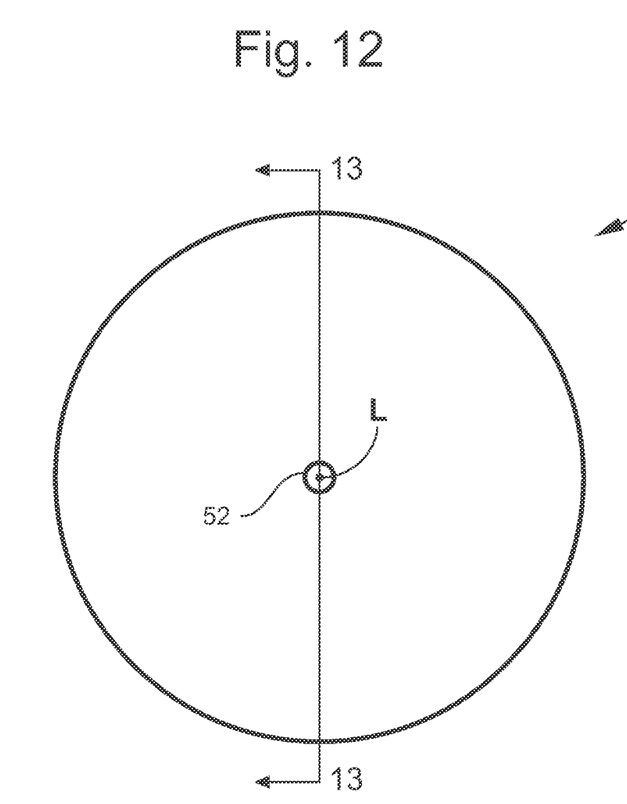
FIG. 12 is an aft view of a preform used in a process of making an obturator.
Figure 13:
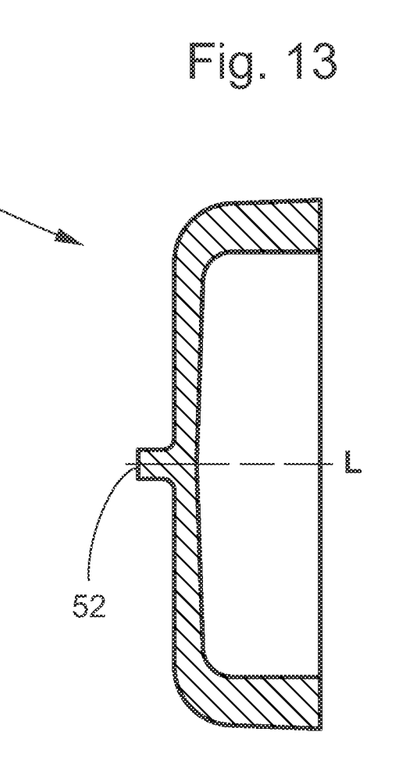
FIG. 13 is a sectional view along the line 13-13 of FIG. 12.
Figure 14:
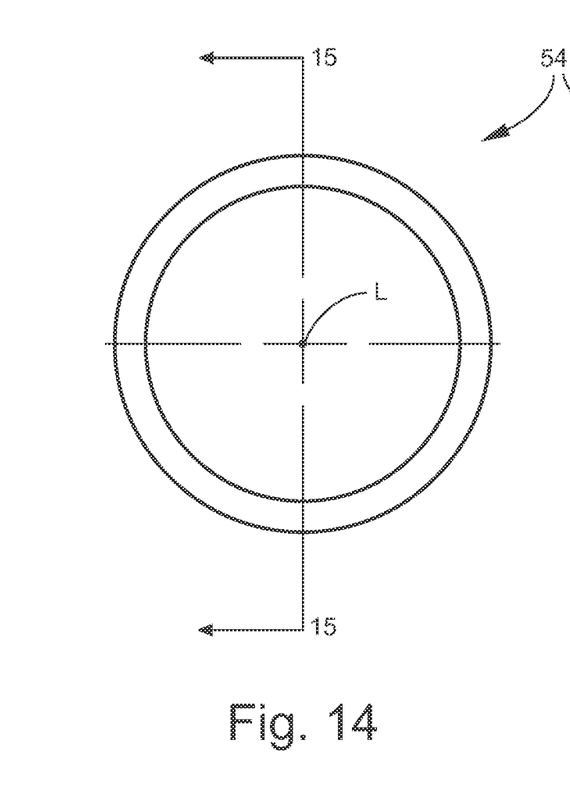
FIG. 14 is an aft view of a machined preform
Figure 15:
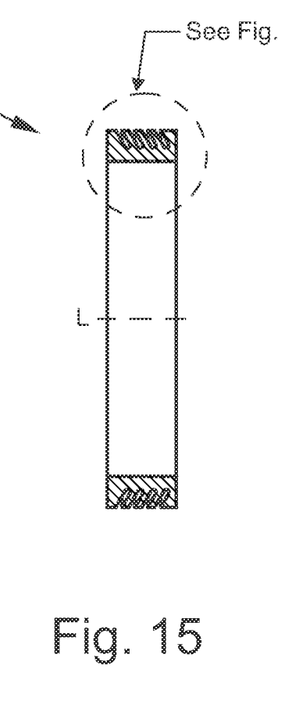
FIG. 15 is a sectional view along the line 15-15 of FIG. 14.

One method of fabricating a composite obturator includes injection molding a preform using a plastic material. One example of an injection molded preform 50 is shown in FIGS. 12 and 13. Preform 50 has a central longitudinal axis L. Preferably, the injection gate is located so that it does not compromise the structural integrity of the preformed part 50. FIG. 13 shows an example of a suitable gate location 52. The preform 50 of FIGS. 12 and 13 is then machined into a generally annular ring, for example, ring 54 shown in FIGS. 14 and 15. One or more circumferential grooves 56 are machined in ring 54. The embodiment in the Figs. shows four grooves 56.

Figure 16:
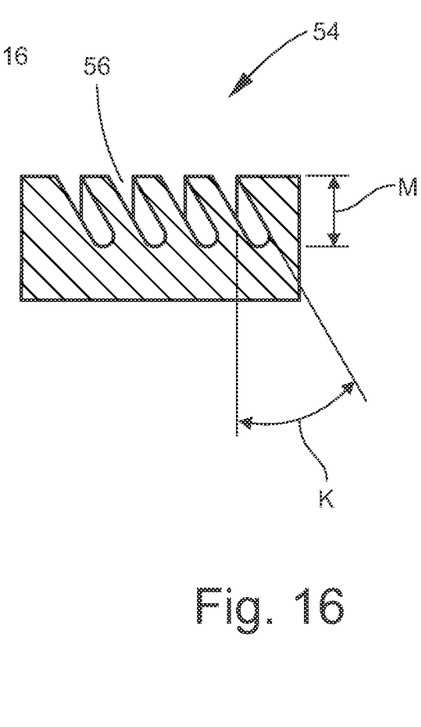
FIG. 16 is an enlarged view of a portion of FIG. 15.
Figure 17:
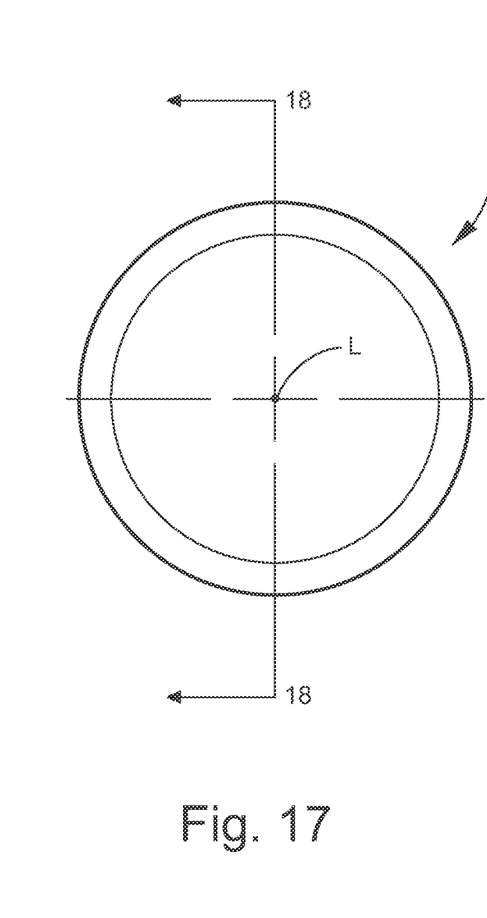
FIG. 17 is an aft view of a machined preform wrapped with high strength fiber.
Figure 18:
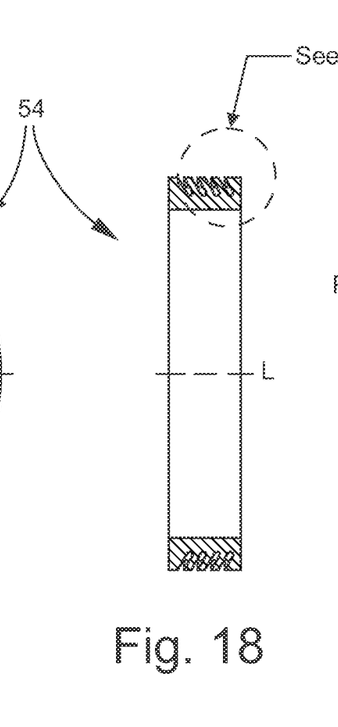
FIG. 18 is a sectional view along the line 18-18 of FIG. 17.

FIG. 16 is an enlarged view of grooves 56. Grooves 56 are parallel and slanted aft. The groove angle K with respect to a line normal to axis L may be in the range of about twenty degrees to about forty degrees. Preferably, the groove angle K is about thirty degrees. The groove depth M is such that a portion of each groove 56 is radially inward of the radially innermost point where the rifling of tube 10 can engage groove 56.

Figure 19:
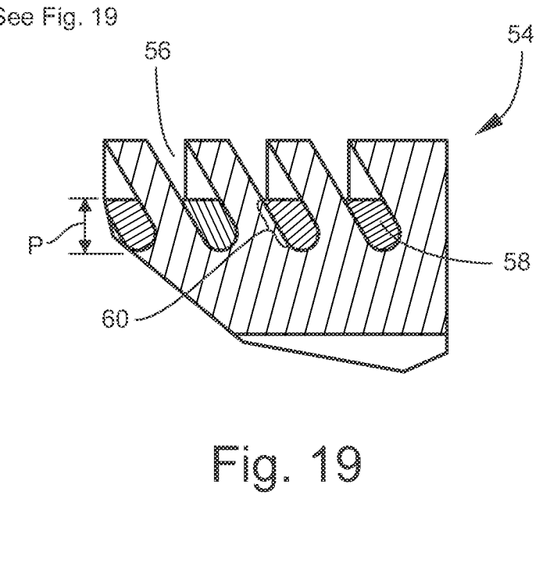
FIG. 19 is an enlarged view of a portion of FIG. 18.
Figure 20:
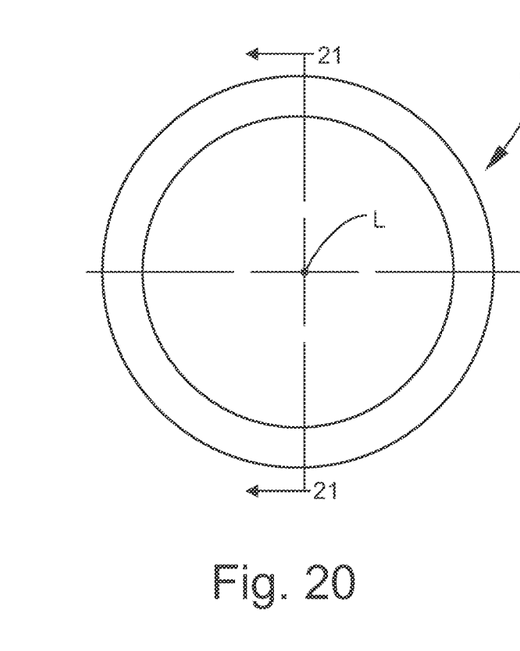
FIG. 20 is an aft view of an overmolded machined preform wrapped with high strength fiber.
Figure 21:
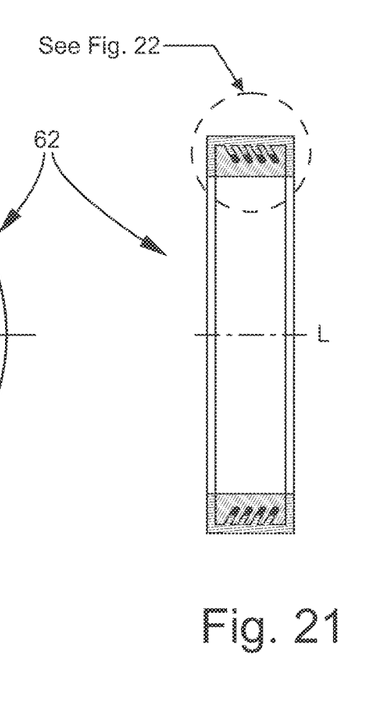
FIG. 21 is a sectional view along the line 21-21 of FIG. 20.

Next, as shown in the enlarged view of FIG. 19, high-strength fibers 58 are wrapped circumferentially in a bottom portion 60 of each groove 56. A small hole (not shown) may be drilled through the top of annular ring 54 into each groove 56. Through the hole, the fiber 58 is inserted and tied off to enable the fiber 58 to be tensioned while wrapping. The fiber 58 is wrapped in each groove 56 until the desired depth, number of wraps or diameter of fiber is attained. Then, the end of the fiber 58 in each groove 56 is frayed and fixed to the wrapped fiber 58.

Preferably, the radial clearance between the outermost radial extent of the fiber 58 in each groove 56 and the innermost radial extent of lands 16 (FIG. 2) in tube 10 is no less than about 2% of the diameter of lands 16 in tube 10. The radial depth or thickness P (FIG. 19) of the fiber wrap 58 in each groove 56 may be from 1% to 5% of the bore diameter to achieve sufficient hoop strength. The wrap must survive the internal pressures on the obturator that are present at muzzle exit. These pressures are caused by muzzle exit pressure and centripetal force of the spinning obturator. The wrap thickness is tailored to achieve the dynamic hoop strength needed to survive the residual pressures under the obturator at muzzle exit and the centripetal force of the spinning obturator. The number, width and spacing of grooves 56 are a function of the required axial volume of the obturator and the hoop stress. The required axial volume of the obturator is a function of the caliber of the launch tube.

Figure 22:
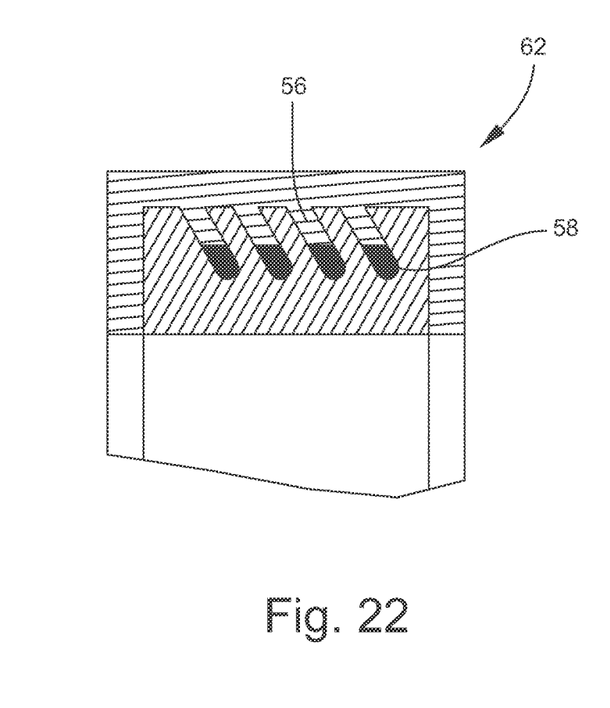
FIG. 22 is an enlarged view of a portion of FIG. 21.

Then, as shown in the enlarged view of FIG. 22, the ring 54 with the wrapped fibers 58 is placed in another mold and over-molded with a plastic material to form an overmold 62. The plastic material may the same material used for preform 50 or may be another plastic material. The gate location should be the same as with the pre-form 50 or gated sufficiently to insure that a complete overmold with no voids is created. The over-mold material secures the fiber 58 in grooves 56 and completely fills the remaining space in the grooves 56. The overmold ring 62 is then removed from the mold and finish machined to the desired geometry of the finished obturator.

Figure 23:
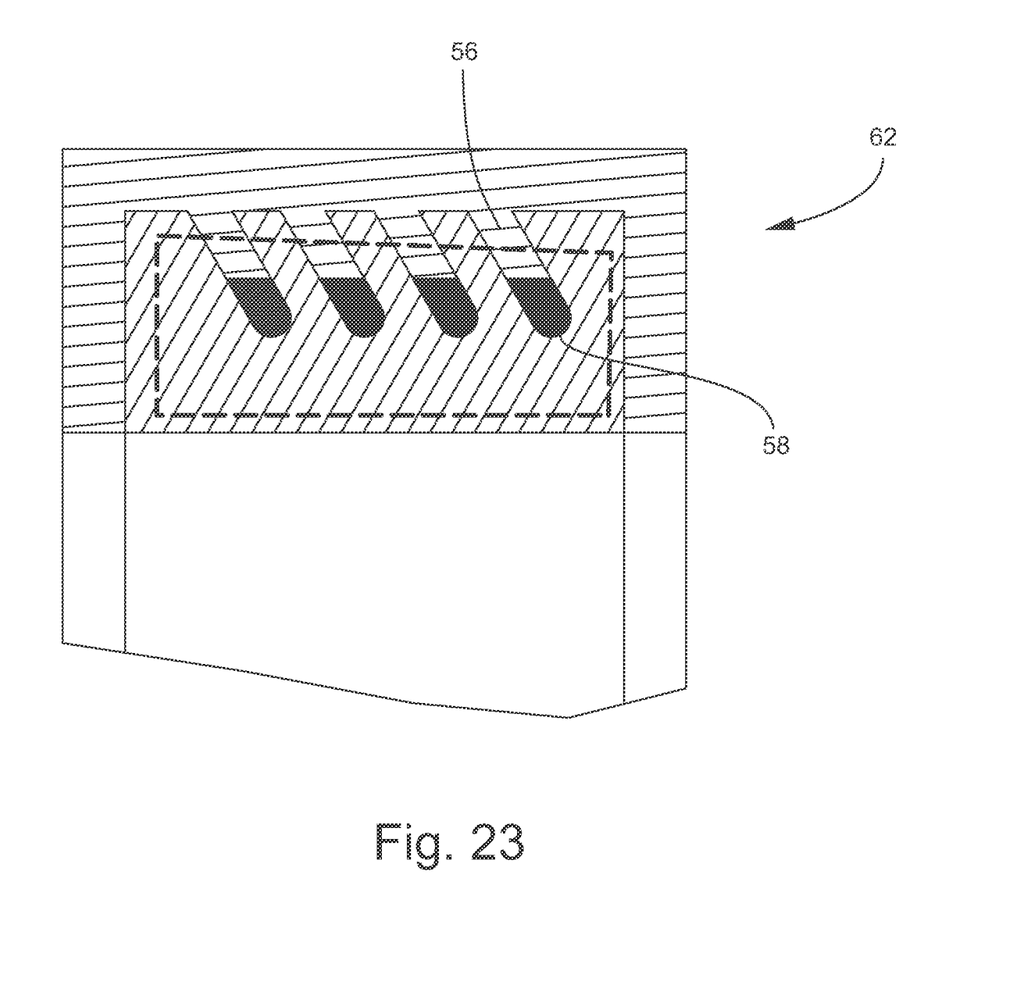
FIG. 23 is a view similar to FIG. 22, showing the outline of the finished obturator.
Figure 24:
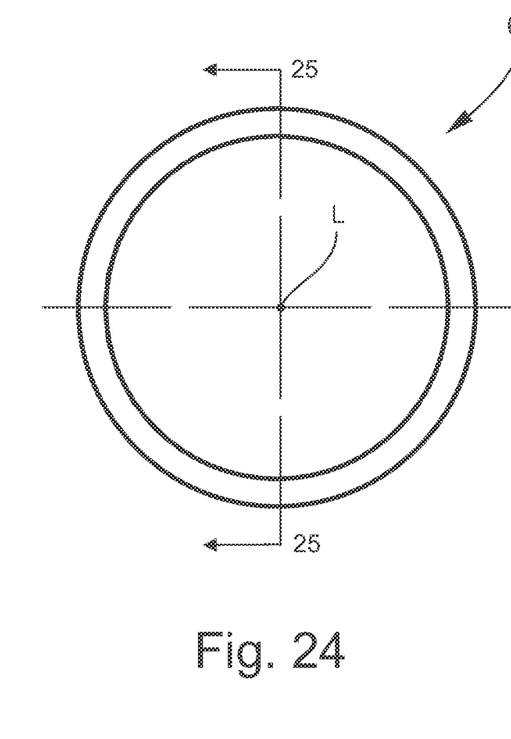
FIG. 24 is an aft view of a finished obturator.
Figure 25:
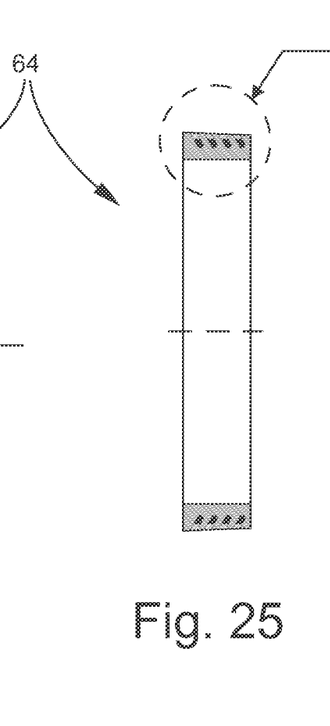
FIG. 25 is a sectional view along the line 25-25 of FIG. 24.
Figure 26:
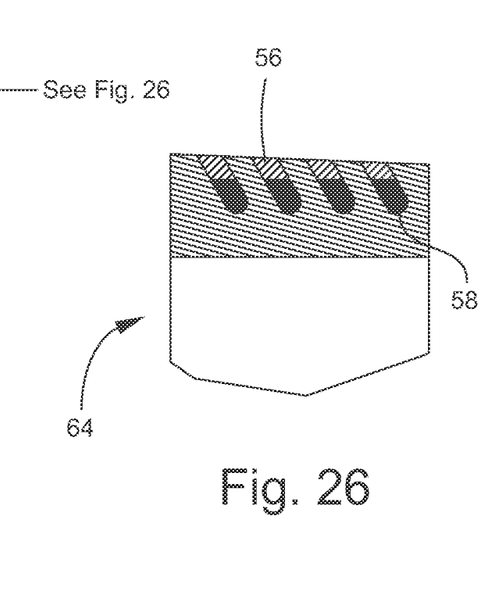
FIG. 26 is an enlarged view of a portion of FIG. 25.

Referring to FIG. 23, the broken line shows an example of a cross-sectional area that will remain in the finished obturator after machining overmolded ring 62. FIG. 26 shows the finished obturator 64. A comparison of the broken line in FIG. 23 and the finished obturator 64 of FIG. 26 shows that the over-molded plastic material is only present in the grooves 56 of the finished obturator 64. Thus, there is no "cold joint" or material contamination in the axial direction of the finished obturator 64 that might be prone to shear during gun launch.

The process of making a high pressure composite obturator described above may be used to make obturators of varying geometry, including obturators 32, 40 and 64.

While the invention has been described with reference to certain embodiments, numerous changes, alterations and modifications to the described embodiments are possible without departing from the spirit and scope of the invention as defined in the appended claims, and equivalents thereof.

What is claimed is:

1. An obturator for a tube-launched projectile having a central longitudinal axis and a circumferential obturator slot (22), the obturator comprising:
   a generally annular ring having a central longitudinal axis
      a radially inward portion having an inside diameter and an axial length;
      a flange portion disposed radially outward of and partially contiguous with the radially inward portion, the flange portion extending axially forward and aft beyond the radially inward portion wherein an outer diameter of the flange portion decreases linearly from an aft most outer diameter to a forward most outer diameter to form a tapered surface, said tapered surface fully extending over the entire length of, and overhanging beyond, the obturator slot (22) in a single, continuously straight linear sloping, tapered surface (38), and wherein a radial clearance, G, between the flange portion and the projectile is greater than a radial clearance, H, between the radially inward portion and a bottom portion of the obturator slot, and wherein the radially inward portion has an axial cross-section in a shape of a frustum of a right circular cone.

2. The obturator of claim 1, wherein a slant angle of the frustum is in a range of five to fifty degrees.

* * * * *